(12) United States Patent
Kikkawa (10) Patent No.: US 6,950,199 B2
(45) Date of Patent: Sep. 27, 2005

(54) DIGITAL COPYING MACHINE

(75) Inventor: Naoya Kikkawa, Toride (JP)

(73) Assignee: Canon Kabushiki Kaisha, Tokyo (JP)

( * ) Notice: Subject to any disclaimer, the term of this patent is extended or adjusted under 35 U.S.C. 154(b) by 930 days.

(21) Appl. No.: 09/789,616

(22) Filed: Feb. 22, 2001

(65) Prior Publication Data

US 2001/0030764 A1 Oct. 18, 2001

(30) Foreign Application Priority Data

Feb. 29, 2000 (JP) ........................................ 2000-053245
Feb. 29, 2000 (JP) ........................................ 2000-053246

(51) Int. Cl.⁷ ............................................ G06F 15/00
(52) U.S. Cl. ...................... 358/1.12; 358/296; 358/458
(58) Field of Search ................ 358/1.18, 296, 358/458; 399/82, 397, 403, 361

(56) References Cited

U.S. PATENT DOCUMENTS 5,797,068 A * 8/1998 Otsuki et al. ................ 399/110
5,913,093 A * 6/1999 Yamanaka et al. ............ 399/82

\* cited by examiner

Primary Examiner—Twyler Lamb
(74) Attorney, Agent, or Firm—Fitzpatrick, Cella, Harper & Scinto (57) ABSTRACT

A digital copying machine having an information processing apparatus includes image forming means and sheet containing means. The image forming means forms an image on a sheet. The sheet containing means is disposed below the image forming means and contains sheets to be supplied to the image forming means, wherein the information processing apparatus is installed above or below the sheet containing means.

25 Claims, 9 Drawing Sheets

DIGITAL COPYING MACHINE

BACKGROUND OF THE INVENTION

1. Field of the Invention

The present invention relates to a digital copying machine.

2. Related Background Art

In some conventional digital copying machines, there is provided an information processing apparatus such as a PC (personal computer) designed as a network capable of informing various users of various information. By using this network, the users can manipulate the information processing apparatus to read and store information by the digital copying machine, to reform the stored information, or to obtain various information from the network, thereby permitting the digital copying machine to print out various information.

Figure 9:
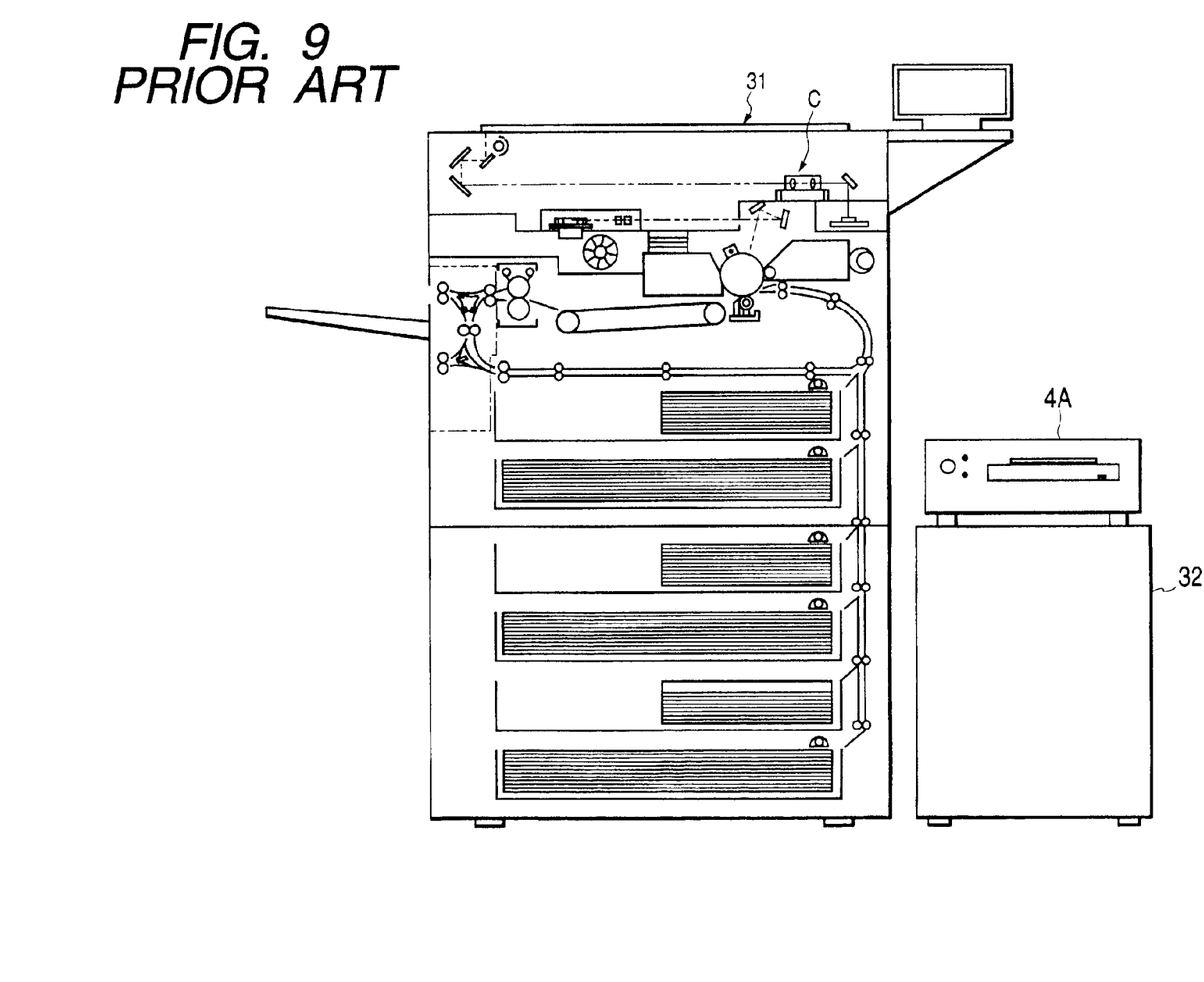
FIG. 9 is a view showing a conventional digital copying machine connected to an information processing apparatus.

FIG. 9 shows an example of a digital copying machine having such an information processing apparatus. In this example, an information processing apparatus 4A is connected to a network and is installed on an installing table 32 disposed aside a digital copying machine 31. The information processing apparatus 4A and the digital copying machine 31 are interconnected through a cable (not shown). With this arrangement, the user merely stands aside the digital copying machine 31 to receive information printed-out from the digital copying machine 31 or to store image data read by an image reading portion C of the digital copying machine 31 in the information processing apparatus 4A. The image data can also be manipulated by the user standing at the apparatus.

Further, since the information processing apparatus 4A is connected to the network, users working within the network can obtain information stored in a server, and can inspect, reform or output image data merely by storing the image data read by the digital copying machine 31 in a network joint holder. Further, even when an amount of image data to be stored is great, the image data can easily be stored using an application function included in the digital copying machine 31.

However, in such a conventional system, if the information processing apparatus 4A is installed aside the digital copying machine 31, respective installation spaces for the digital copying machine 31 and the information processing apparatus 4A are needed, thereby requiring a great total installation space.

In addition, if the environment where the digital copying machine 31 is installed includes high temperature and/or high humidity conditions, the sheets will absorb moisture and may curl, which could result in sheet jam, poor sheet discharging or a poor image, thereby greatly reducing the printer function.

SUMMARY OF THE INVENTION

The present invention is made in consideration of the above-mentioned circumstances, and an object of the present invention is to minimize the size of an installation space.

Another object of the present invention is to provide a digital copying machine which can prevent sheets from curling due to excessive humidity.

In one aspect, the present invention provides a digital copying machine having an information processing apparatus, including image forming means for forming an image on a sheet, and sheet containing means disposed below the image forming means and adapted to contain sheets to be supplied to the image forming means. The information processing apparatus being installed above or below the sheet containing means.

DESCRIPTION OF THE PREFERRED EMBODIMENTS

Embodiments of the present invention will now be explained with reference to the accompanying drawings.

Figure 1:
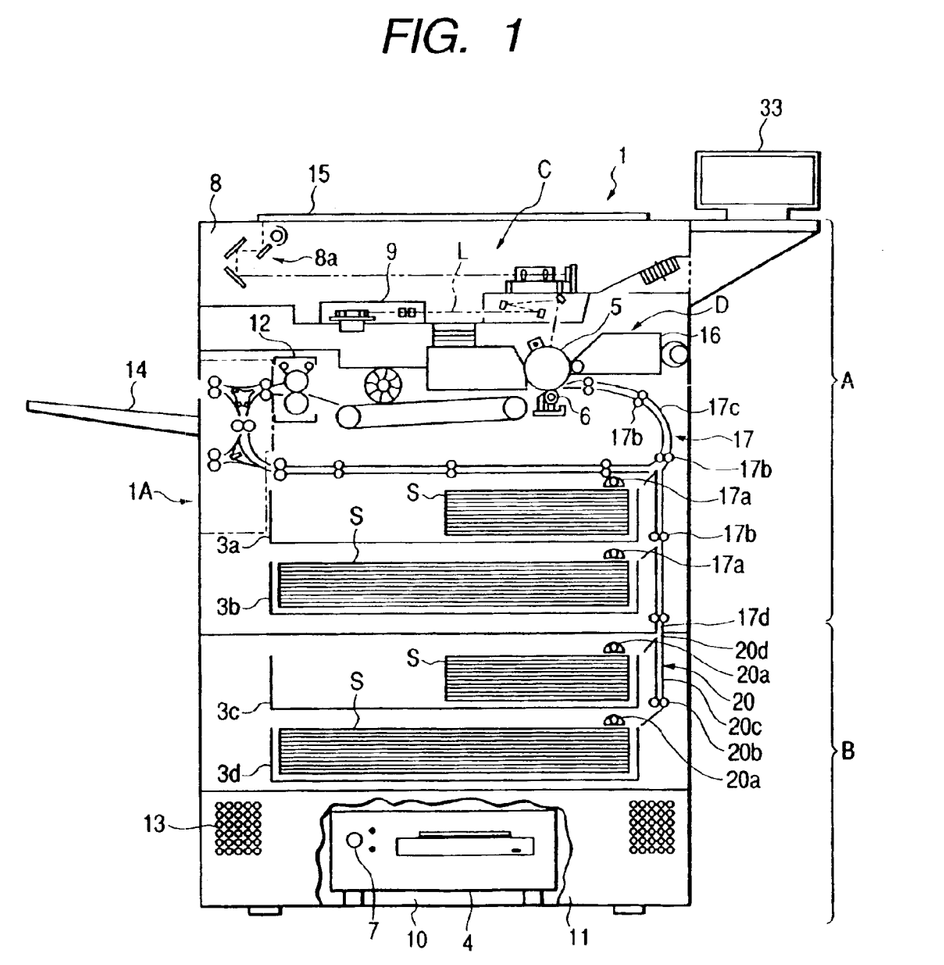
FIG. 1 is a view showing a construction of a digital copying machine according to an embodiment of the present invention.

FIG. 1 is a view showing a construction of a digital copying machine according to a first embodiment of the present invention. In FIG. 1, a digital copying machine 1 has a main body 1A constituted by an upper housing A and a lower housing B. Further, a touch panel display 33 for operating (manipulating) the digital copying machine 1 is attached to an upper surface of the upper housing A.

Within an upper part of the upper housing A, there is provided an image reading portion C including image reading means 8 for reading image information of an original (not shown) set on an original resting plate 15 by driving a scan optical system 8a, and image forming means D for forming an image on a sheet in response to the image information read by the image reading means 8. The image forming means D is disposed below the image reading portion C. The image forming means D includes a laser scanner 9 for emitting a laser beam L in response to the image information and for forming an electrostatic latent image on a surface of a photosensitive drum 5, a developing device 16 for developing the electrostatic latent image formed on the photosensitive drum 5 to form a toner image, and a transfer roller 6 for transferring the toner image formed on the photosensitive drum 5 onto a sheet S. Further, there is provided a fixing apparatus 12 for fixing the toner image to the sheet S.

Further, below the image forming means D of the upper housing A, there are provided sheet feeding cassettes (two-stage sheet containing means) 3a, 3b, sheet feeding rollers (sheet feeding means) 17a for conveying the sheets S contained in the sheet feeding cassettes 3a, 3b to the image forming means D, and a sheet conveying portion 17 including conveying roller pairs 17b and a conveying path 17c. Incidentally, in FIG. 1, the reference numeral 14 denotes a sheet discharge tray for receiving sheets S discharged after toner images are fixed on the sheets S.

On the other hand, the lower housing B is disposed below the upper housing A. Incidentally, the lower housing B is detachably mounted on the upper housing A. Within the lower housing B, there are provided sheet feeding cassettes (two-stage sheet containing means) 3c, 3d, sheet feeding rollers (sheet feeding means) 20a for conveying the sheets S contained in the sheet feeding cassettes 3c, 3d to the conveying path 17 of the upper housing A, and a lower sheet conveying portion 20 including a conveying roller pair 20b and a conveying path 20c.

Incidentally, a sheet feeding-out opening 20d for feeding out the sheets S contained in the sheet feeding cassettes 3c, 3d to the conveying path 17 of the upper housing A is formed in an upper surface of the lower housing B, and a sheet receiving opening 17d for directing the sheet fed out from the lower housing B into the conveying path 17c is formed in a bottom surface of the upper housing A.

Further, in order to accurately align the sheet feeding-out opening 20d of the lower housing B with the sheet receiving opening 17d of the upper housing A, positioning pins (not shown) are provided on one of the upper and lower housing A, B and positioning holes (not shown) for receiving such positioning pins are provided in the other housing.

When the upper housing A is set on the lower housing B, by fitting the positioning pins into the corresponding positioning holes, the sheet receiving opening 17d is aligned with the sheet feeding-out opening 20d with high accuracy.

Next, an image forming operation of the digital copying machine 1 having the above-mentioned construction will be explained.

First of all, the image information of the original (not shown) rested on the original resting plate 15 is read by the image reading means 8 by driving the scan optical system 8a, and, on the basis of the read image information, the laser scanner 9 emits the laser beam L, thereby forming the electrostatic latent image on the surface of the photosensitive drum 5. Then, the electrostatic latent image formed on the surface of the photosensitive drum 5 is developed by the developing device 16, thereby forming the toner image.

In synchronous with the formation of the toner image, a sheet S is fed from the sheet feeding cassette 3a, 3b, 3c or 3d of the upper housing A or the lower housing B by means of the sheet feeding roller 17a or 20a and is conveyed to a transfer nip between the photosensitive drum 5 and the transfer roller 6 through the conveying roller pair(s) 17b or 20b and the conveying path 17c or 20c. In the transfer nip, the toner image formed on the photosensitive drum 5 is transferred onto the sheet S. Then, the sheet S is conveyed to the fixing apparatus 12, where the toner image is fixed to the sheet. Thereafter, the sheet is discharged onto the sheet discharge tray 14.

Next, a mounting arrangement of a personal computer as an image processing apparatus, which is a characteristic portion of the present invention, will be explained. In FIG. 1, a personal computer (referred to as a "PC" hereinafter) 4 as the image processing apparatus is installed in an installation space 10 within the lower housing B. Since the installation space 10 has a volume sufficient to contain the PC 4, there are many degrees of freedom regarding the installation position of the PC 4 and the dimension of the PC 4, thereby permitting installation of general personal computers, as well as the PC 4 specific to the system.

The PC 4 is installed in such a manner that an operating surface thereof including a power switch 7 is directed toward a front surface of the digital copying machine 1, so that the operator can turn ON/OFF a power supply of the PC 4 and mount and dismount an FD and a CD-ROM at a front side of the digital copying machine 1. Incidentally, in the illustrated embodiment, the operating side of the PC 4 is the same as the operating sides of the sheet feeding cassettes 3a, 3b, 3c, 3d, and coincides with the front side of the digital copying machine 1.

Figure 4:
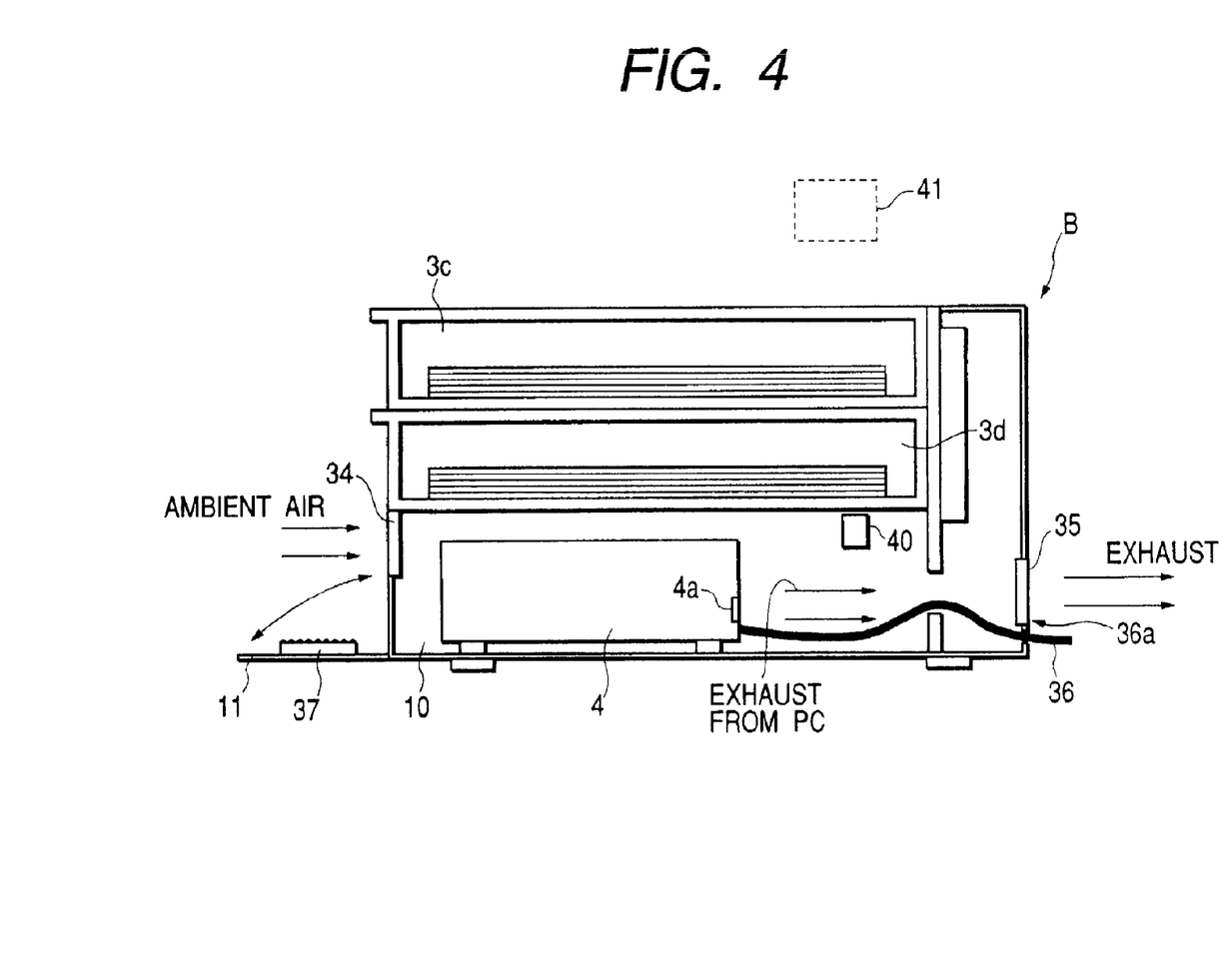
FIG. 4 is a sectional view showing the exhaust means of FIG. 3 in detail.

Further, as shown in FIG. 4, electrical connection between the PC 4 and the digital copying machine 1 is effected by connecting a cable 36 attached to the PC 4 to a cable connector (not shown) provided on a back surface of the upper housing A through a cable hole 36a formed in a back surface of the lower housing B.

By the way, in the illustrated embodiment, the lower housing B is designed to have a floor area equal to or smaller than a floor area of the upper housing, so that the PC 4 can be installed within the lower part of the main body 1A of the machine so long as there is an installation area for the digital copying machine 1. By installing the PC 4 within the lower part of the digital copying machine 1 in this way, space can be saved.

Incidentally, the upper housing A and the lower housing B can be separated from each other and can provide integral appearance by fitting the positioning pins into the positioning holes as mentioned above, so that the housings can be handled as a unit. Further, when the lower housing B can be attached optionally, since the upper housing A has the function and appearance of the digital copying machine 1, the upper housing A can be used as a single part without the lower housing B.

On the other hand, in the illustrated embodiment, the PC 4 is disposed below the sheet feeding cassettes 3c, 3d. By providing the PC 4 below the sheet feeding cassettes 3c, 3d in this way, the sheet feeding cassettes 3c, 3d are warmed by hot air warmed by heat from the PC 4, with the result that excessive moisture in the sheets S contained in the sheet feeding cassettes 3c, 3d is removed.

Incidentally, in the illustrated embodiment, a plurality of vent holes (not shown) are formed in sheet feeding cassette rails 18a, 18b, 18c, 18d (FIG. 2) provided within the lower housing and adapted to detachably draw the sheet feeding cassettes 3c, 3d. With this arrangement, the air warmed by the heat from the PC 4 spreads over the entire interior of the lower housing, thereby increasing the entire environmental temperature within the lower housing.

Figure 2:
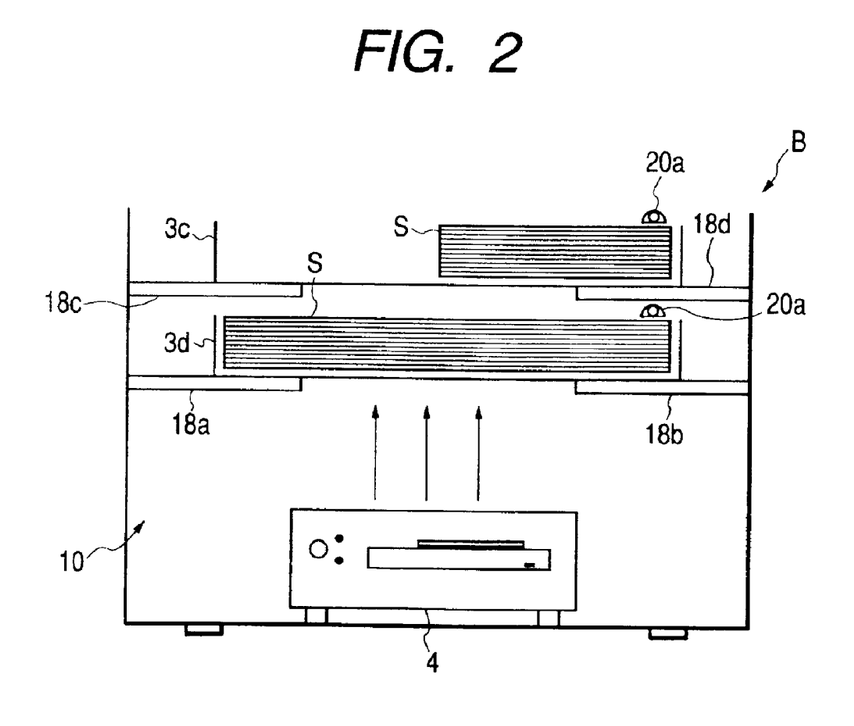
FIG. 2 is a sectional view of a lower housing of the digital copying machine of FIG. 1.

By increasing the entire environmental temperature within the lower housing in this way, regarding not only the sheet feeding cassette 3d but also the sheet feeding cassette 3c disposed above the sheet feeding cassette 3d, excessive moisture can be removed from the sheets S. Further, by transferring the heat from the lower housing B to the upper housing A, the sheet feeding cassettes 3a, 3d in the upper housing A can be warmed indirectly. For example, by forming vent holes in a partition plate between the upper housing A and the lower housing B or by using a partition plate made of good heat conductive material, transmission of heat to the interior of the upper housing can be achieved.

In this way, by installing the PC 4 within the lower housing B and by warming the sheet feeding cassettes 3a, 3b, 3c, 3d by the heat from the PC 4 to remove the excessive moisture from the sheets S, even if the digital copying machine 1 is installed in a high temperature and high humidity environment, the sheet curling due to moisture can be prevented. As a result, sheet jam, poor sheet discharging and poor image formation can be prevented, thereby maintaining the function of the digital copying machine 1.

Incidentally, in FIG. 1, by providing a front cover 11 arranged in front of the containing space 10 of the lower housing B, the operator can be prevented from kicking against the PC 4 erroneously or dirt or dust can be prevented from entering into the containing space. Further, when a locking mechanism such as a key is provided on the front cover 11, operation of the PC 4 effected by any person other than the manager can be prevented.

In addition, when the PC 4 is used, since a required usage environmental temperature must be maintained, in the embodiment shown in FIG. 1, a louver or a plurality of exhaust holes 13 are provided in the front cover 11 as exhausting means. By exhausting the air within the containing space by means of the exhausting means through the exhaust holes 13 while circulating the air, the temperature of the containing space 10 can be prevented from being increased excessively by the heat of the PC 4.

Further, by discharging the air in the containing space to outside in this way, the moisture vaporized from the sheets S by the heat of the PC 4 can also be discharged to the outside, thereby preventing dew in the containing space. Incidentally, the dimension and number of the exhaust means are appropriately determined in consideration of the moisture amount in the sheet S and the usage environmental temperature of the PC 4.

In this way, by installing the PC 4 below the digital copying machine 1, the installation space can be reduced, and, by removing the excessive moisture from the sheets S by the heat from the PC 4, the sheet S can be prevented from being curled due to excessive moisture.

Figure 3:
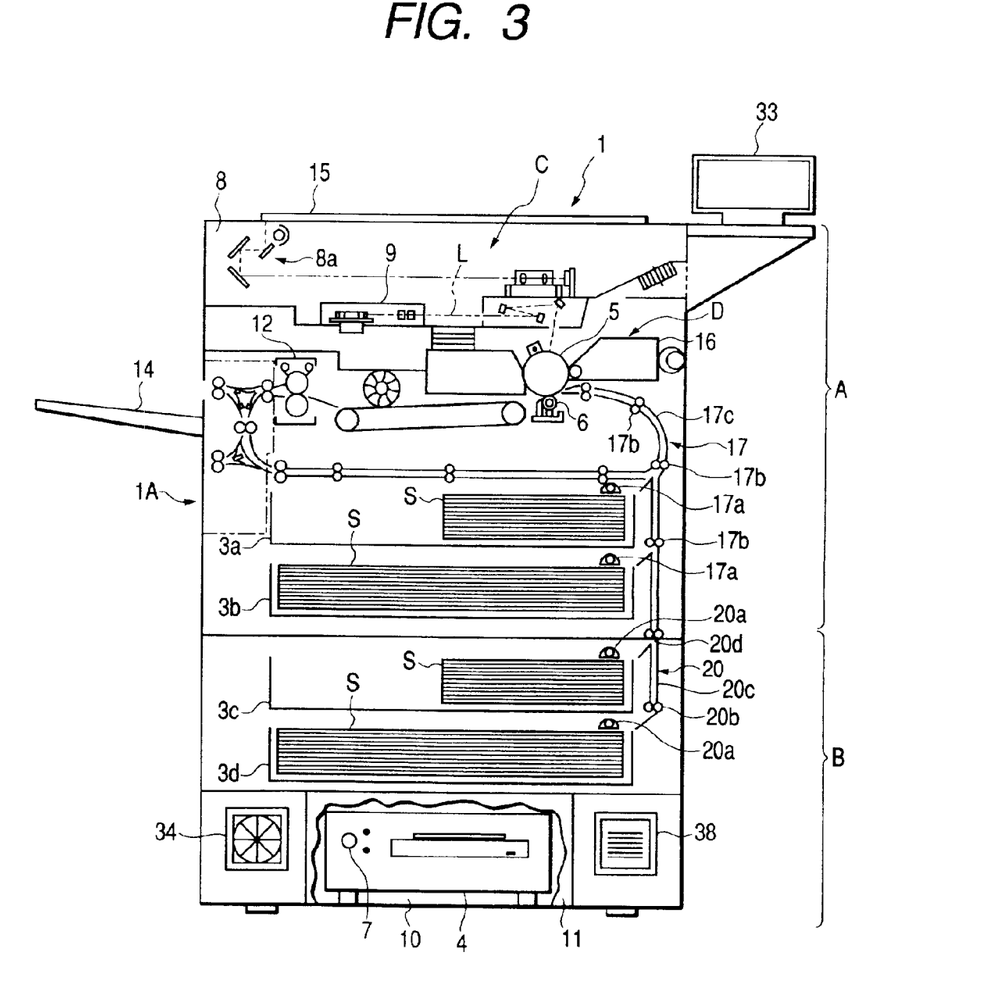
FIG. 3 is a view showing an example of exhaust means of the digital copying machine.

Further, as shown in FIGS. 3 and 4, as the exhaust means, a suction fan 34 for sucking air may be provided in front of the containing space 10 and a blowing fan 35 may be provided behind the containing space 10 so that the air flows from forward to rearward within the containing space 10 by means of these two fans 34, 35.

By flowing the air from forward to rearward by means of the exhaust means comprised of the two fans 34, 35, it is possible to control in such a manner that the temperature (environmental temperature) within the lower housing B is prevented from increasing not less than the usage environmental temperature (about 35 EC) of the PC 4 by the heat from the PC 4.

Further, by adjusting air blowing amounts of the fans 34, 35, the optimum temperature within the lower housing B can be maintained. In addition, by discharging the air in the containing space to outside in this way, the moisture vaporized from the sheets S by the heat of the PC 4 can be discharged to outside, thereby preventing condensation in the containing space.

Incidentally, since the PC 4 is normally provided at its rear side with a blowout fan 4$a$, when the air in the containing space 10 flows rearwardly as is in the illustrated embodiment, the air blown out from the PC 4 is discharged to outside through the rear surface of the lower housing B as it is, thereby improving the exhausting efficiency.

Further, in FIG. 4, the reference numeral 40 denotes a temperature sensor as temperature detecting means for detecting the temperature within the lower housing; and 41 denotes a CPU as control means provided at a predetermined position in the main body 1A of the machine, for example, on the upper housing A.

The CPU 41 serves to drive the fans 34, 35 if the temperature within the lower housing B exceeds a predetermined temperature, on the basis of a temperature detection signal from the temperature sensor 40. By driving the fans 34, 35 if the temperature within the lower housing B exceeds the predetermined temperature in this way, the sheets S in the sheet feeding cassettes can be warmed efficiently and the PC usage environmental temperature within the housing can be controlled efficiently. Further, power consumption can be reduced in comparison with a case where the fans 34, 35 are always operated, thereby saving energy.

Next, operating means for the PC 4 will be explained. As shown in FIG. 3, a PC display 38 is provided on the front surface of the lower housing B at a lower part thereof. By providing the PC display 38 on the front surface of the lower housing B at the lower part thereof in this way, operability of the PC 4 can be enhanced.

Further, in the illustrated embodiment, the front cover 11 is provided on the lower housing B for rocking movement around a lower end of the cover, and a PC keyboard 37 is attached to an inner surface of the front cover 11 (FIG. 4).

By attaching the PC keyboard 37 to the inner surface of the front cover 11 in this way, when the front cover 11 is opened, a condition that the keyboard 37 can be used is established, and, when the front cover 11 is closed, the keyboard 37 is concealed simultaneously. Further, when the front cover 11 is opened, the front cover 11 is rocked downwardly to also act as a table for the keyboard 37. As a result, degree of freedom of installation of the PC 4 and the operability of the keyboard 37 can be improved.

The PC 4 may be connected to the digital copying machine 1 in such a manner that a touch panel display 33 of the digital copying machine 1 can be used as the operating means for the PC 4. Alternatively, a liquid crystal display and a keyboard may be detachably provided on the upper surface of the digital copying machine 1.

Figure 5:
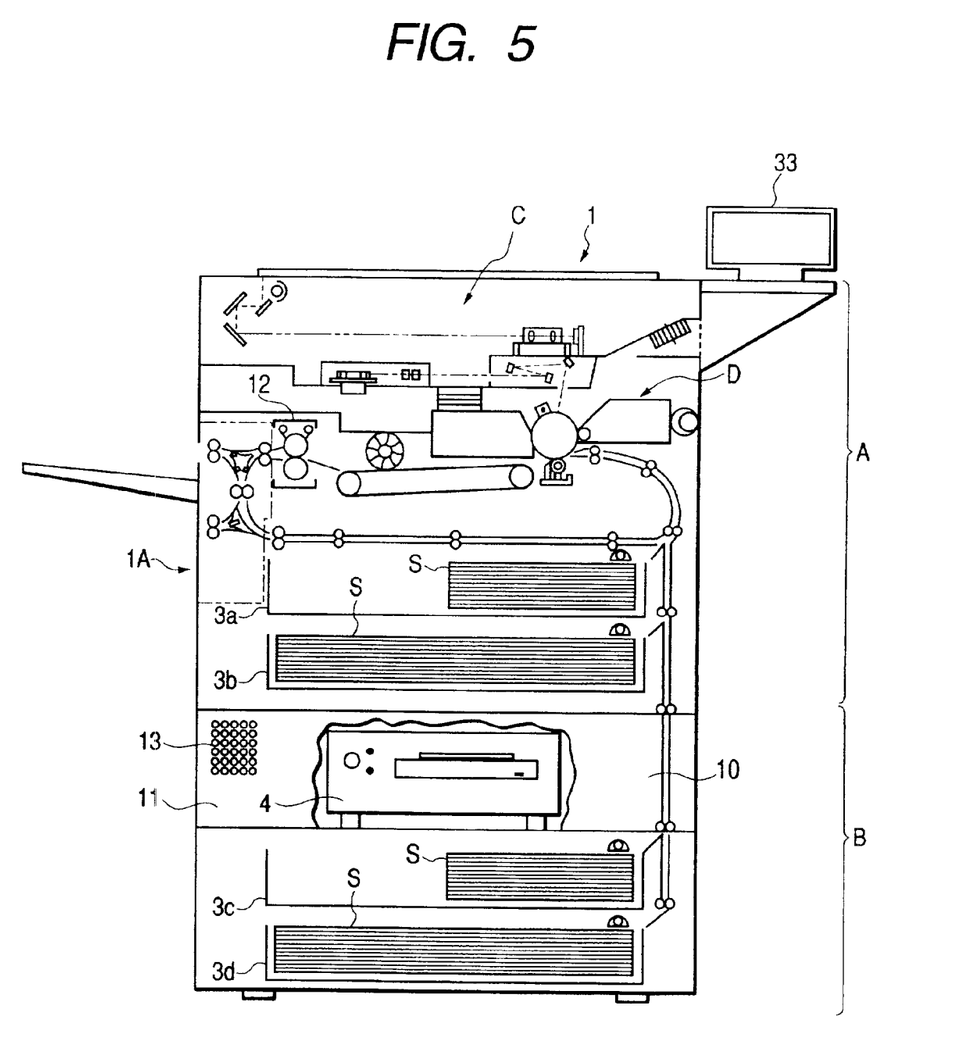
FIG. 5 is a view showing an example in which an installation position of an information processing apparatus of a digital copying machine according to the present invention is changed.

While an example in which the PC 4 is installed below the sheet feeding cassettes 3$c$, 3$d$ has been explained, the present invention is not limited to such an example. As shown in FIG. 5, for example, the PC 4 may be installed above the sheet feeding cassettes 3$c$, 3$d$. In this case, the PC 4 is installed above the lower housing B and the sheet feeding cassettes 3$c$, 3$d$ are installed below the lower housing. Incidentally, the lower housing B may be divided into a housing for the PC 4 and a housing for the sheet feeding cassettes 3$c$, 3$d$, which housings are stacked. With this arrangement, if desired, the housing for the PC 4 and the housing for the sheet feeding cassettes 3$c$, 3$d$ can be reversed or exchanged in the vertical direction.

Figure 6:
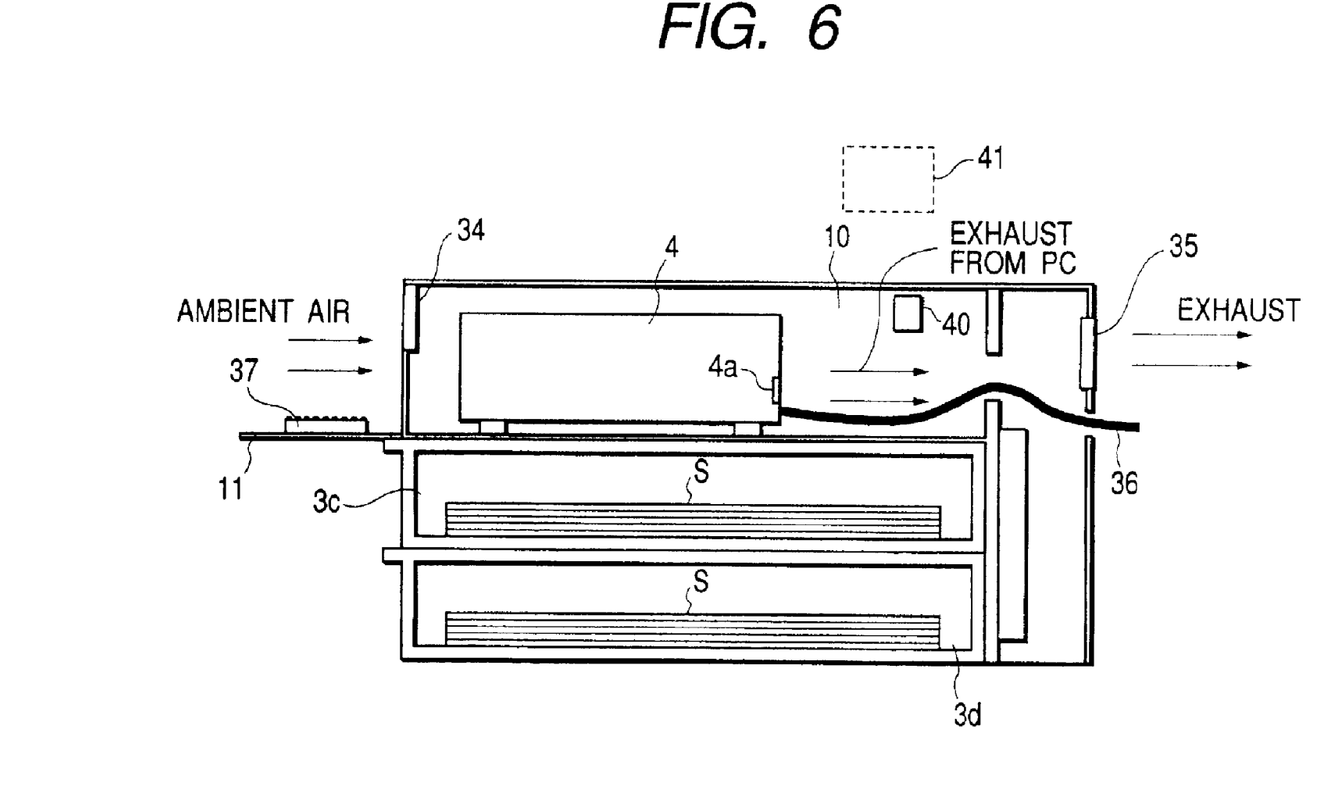
FIG. 6 is a sectional view of a lower housing of the digital copying machine of FIG. 5.

By installing the PC 4 in such a position, since the position of the PC 4 becomes higher, the operability of the PC 4 is enhanced, as well as the above-mentioned effects. Incidentally, even when the PC 4 is installed in such a position, by providing the louver or the plurality of exhaust holes 13 as the exhaust means on the front cover 11, since the air within the containing space can be circulated, the excessive moisture can be removed from the sheets S. Further, as shown in FIG. 6, as the exhaust means, fans having the same constructions of the fans 34, 35 explained in connection with FIG. 4 maybe used.

Incidentally, as mentioned above, the PC 4 may be a general purpose PC.

Figure 7:
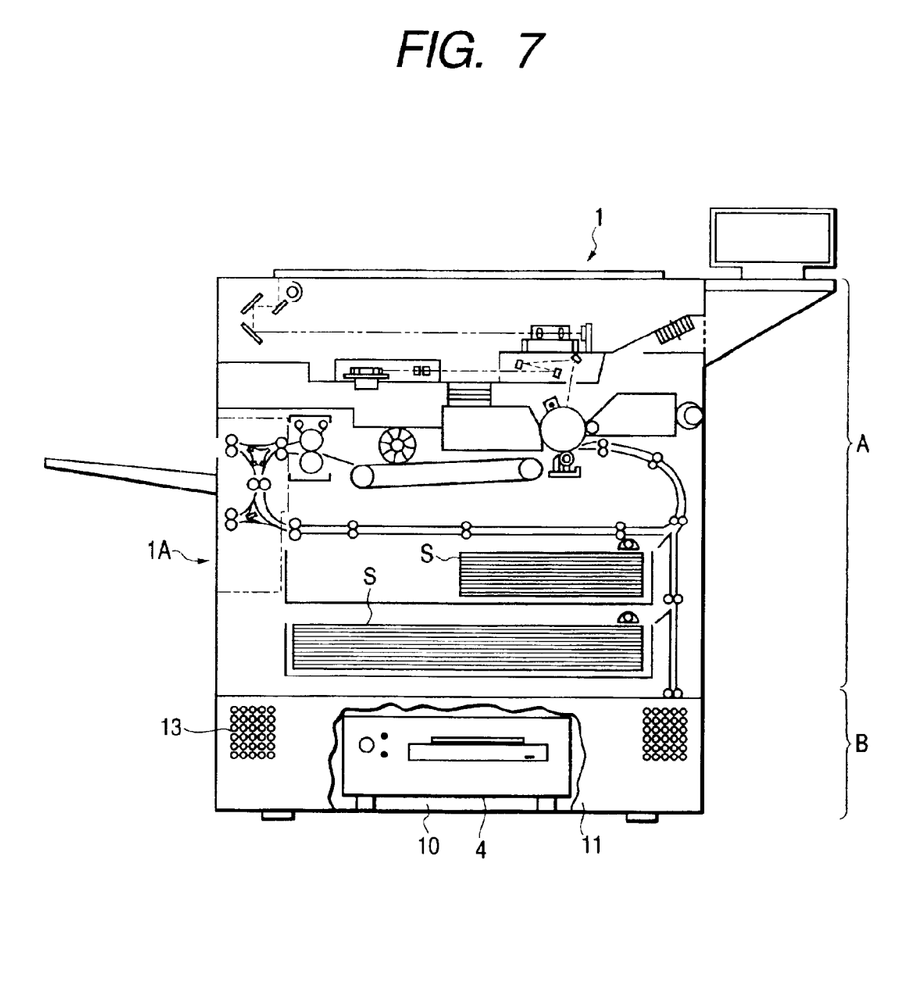
FIG. 7 is a view showing an example in which only an information processing apparatus is installed in the lower housing of the digital copying machine according to the present invention.

While an example in which the sheet feeding cassettes 3$c$, 3$d$ are provided within the lower housing B to increase the sheet containing ability was explained, if there is no need for providing the sheet feeding cassettes 3c, 3d, as shown in FIG. 7, only the PC 4 may be contained in the lower housing B.

When the lower housing is designed to exclusively include the PC 4 in this way, since the containing space 10 can be further expanded, the degree of freedom of the PC 4 can further be increased, as well as the above-mentioned effects. In addition, by adjusting the height of the lower housing B, the height of the digital copying machine 1 can be adjusted for easy handling by the operator.

While an example has been explained in which the upper and lower housings A, B are provided and the lower housing B including the PC 4 can be mounted to the upper housing A, a single housing may alternatively be provided, and the image forming means, sheet containing means and information processing apparatus may be installed within the single housing. In this case, the sheet containing means is installed below the image forming means and the information processing apparatus is installed below the sheet containing means. If the information processing apparatus is not required, the operator can use the system without the information processing apparatus.

Figure 8:
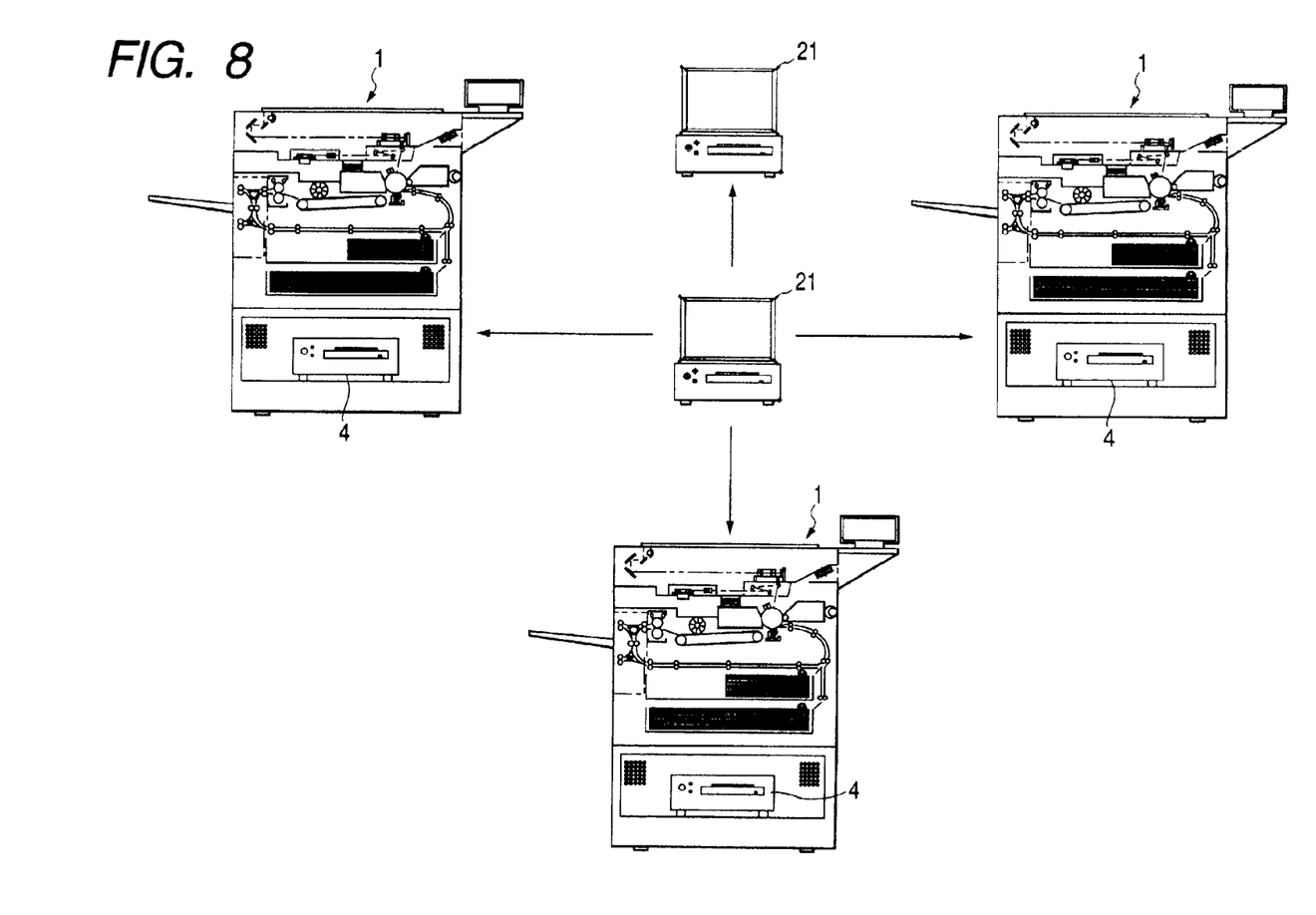
FIG. 8 is a view showing an example in which a digital copying machine according to the present invention is connected to a network.

Further, when the PC 4 connected to the digital copying machine is connected to a network server 21 as shown in FIG. 8, required information can be derived from the server 21 collectively governing the information, by using the PC 4 of the digital copying machine, and the information can be outputted then and there. For example, output for reservation and/or sale of various tickets and output for request of individual certification in a public office can be effected. Further, merely by storing the image data read by the digital copying machine 1 in the common holder of the network, the user in the network environment can inspect, reform and/or output the image data by another digital copying machine 1.

What is claimed is:

1. A digital copying machine having an information processing apparatus, comprising:
    image forming means for forming an image on a sheet; and
    sheet containing means, disposed below said image forming means, for containing sheets to be supplied to said image forming means;
    wherein said image forming means, said sheet containing means and the information processing apparatus are disposed in a main body of said digital copying machine, and wherein said information processing apparatus is installed adjacently above or adjacently below said sheet containing means.

2. A digital copying machine according to claim 1, wherein said main body includes an upper housing and a lower housing disposed below said upper housing, and wherein said image forming means and said sheet containing means are disposed within said upper housing and said information processing apparatus is disposed within said lower housing.

3. A digital copying machine according to claim 2, further comprising:
    second sheet containing means, disposed within said lower housing, for containing sheets to be supplied to said image forming means, wherein said information processing apparatus is installed adjacently above or adjacently below said second sheet containing means.

4. A digital copying machine according to claim 2, wherein said upper and lower housings are detachably attached to each other.

5. A digital copying machine according to claim 3, wherein said sheet containing means and said second sheet containing means include (i) one or more sheet feeding cassettes that contain sheets and are drawable from each of said respective housings, and (ii) sheet feeding means for feeding out sheets from said sheet feeding cassettes.

6. A digital copying machine according to claim 5, wherein an operating side for mounting and dismounting said sheet feeding cassettes is the same as an operating side of said information processing apparatus.

7. A digital copying machine according to claim 2, further comprising:
    exhaust means for exhausting air within said lower housing, wherein said exhaust means is provided on said lower housing.

8. A digital copying machine according to claim 7, wherein said exhaust means are provided on a front surface and a rear surface of said lower housing, and include a suction fan for sucking ambient air into said lower housing and a blowout fan for blowing the air from said lower housing.

9. A digital copying machine according to claim 8, further comprising:
    temperature detecting means for detecting a temperature within said lower housing; and
    control means for driving said exhaust means if the temperature within said lower housing exceeds a predetermined temperature based on the temperature detected by said temperature detecting means.

10. A digital copying machine according to claim 1, further comprising:
    exhaust means for exhausting air within said main body to outside said main body.

11. A digital copying machine according to claim 2, further comprising:
    a rotatable front door provided on a front surface of said lower housing; and
    a keyboard for operating said information processing apparatus, attached to an inside of said front door,
    wherein when said front door is opened, said front door is a table for said keyboard.

12. A digital copying machine according to claim 11, wherein said sheet containing means includes (i) a sheet feeding cassette that contains a sheet and is drawable from said housing, and (ii) sheet feeding means for feeding out the sheet from the sheet feeding cassette, and
    wherein an operating side for mounting and dismounting the sheet feeding cassette is the same as an operating side of said information processing apparatus.

13. A digital copying machine according to claim 12, wherein a display for said information processing apparatus is provided on the front surface of said lower housing.

14. A digital copying machine according to claim 1, further comprising:
    a touch panel display provided at an upper portion,
    wherein connection is effected so that said information processing apparatus can be operated by using a touch panel display provided at an upper portion, for operating said digital copying machine.

15. A digital copying machine according to claim 1, wherein a display and a keyboard for operating said information processing apparatus are provided on an upper surface of said digital copying machine.

16. A digital copying machine according to claim 1, wherein said information processing apparatus is connected to a network so that communication of information can be effected by a server on the network.

17. A digital copying machine according to claim 1, wherein a plurality of said digital copying machines are network-connected through said information processing apparatus.

18. A digital copying machine having an information processing apparatus, said digital copying machine comprising:

image forming means for forming an image on a sheet, said image forming means being disposed in a first housing; and sheet containing means for containing sheets to be supplied to said image forming means, said sheet containing means being disposed in a second housing, detachably attachable to the first housing, wherein said information processing apparatus is installed in said second housing, adjacently above or adjacently below said sheet containing means.

19. A digital copying machine according to claim 18, wherein said sheet containing means includes (i) a sheet feeding cassette that contains a sheet and is drawable from said housing, and (ii) sheet feeding means for feeding out the sheet from said sheet feeding cassette, and wherein an operating side for mounting and dismounting the sheet feeding cassette is the same as an operating side of the information processing apparatus.

20. A digital copying machine according to claim 18, further comprising:

exhaust means, provided on said second housing, for exhausting air within said second housing to outside of said second housing.

21. A digital copying machine according to claim 20, wherein said exhaust means are provided on a front surface and a rear surface of said second housing and the exhaust means includes a suction fan for sucking ambient air into said second housing and a blowout fan for blowing air from the second housing.

22. A digital copying machine according to claim 21, further comprising:

temperature detecting means for detecting a temperature within said second housing; and control means for driving said exhaust means if the temperature within said second housing exceeds a predetermined temperature, based on the temperature detected by said temperature detecting means.

23. A digital copying machine according to claim 18, further comprising:

exhaust means, wherein said image forming means, said sheet containing means and said information processing apparatus are installed within a main body, and said exhaust means is provided on said main body to exhaust air within said main body to outside.

24. A digital copying machine according to claim 18, wherein said information processing apparatus is connected to a network so that communication of information can be effected by a server on said network.

25. A digital copying machine according to claim 18, wherein a plurality of digital copying machines are network-connected through said information processing apparatus.

* * * * *